(12) United States Patent
Nakanishi

(10) Patent No.: US 10,247,299 B2
(45) Date of Patent: Apr. 2, 2019

(54) SHIFT DEVICE

(71) Applicant: KABUSHIKI KAISHA TOKAI-RIKA-DENKI-SEISAKUSHO, Aichi (JP)

(72) Inventor: Kenji Nakanishi, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 404 days.

(21) Appl. No.: 14/885,054

(22) Filed: Oct. 16, 2015

(65) Prior Publication Data

US 2016/0109017 A1   Apr. 21, 2016

(30) Foreign Application Priority Data

Oct. 21, 2014   (JP) ................................ 2014-214784

(51) Int. Cl.
*F16H 59/02* (2006.01)
*F16H 59/10* (2006.01)
*F16H 61/22* (2006.01)

(52) U.S. Cl.
CPC ......... *F16H 59/10* (2013.01); *F16H 59/0278* (2013.01); *F16H 61/22* (2013.01); *F16H 2059/0282* (2013.01)

(58) Field of Classification Search
CPC ............................................. F16H 2059/0282
See application file for complete search history.

(56) References Cited

U.S. PATENT DOCUMENTS

| | | | | |
|---|---|---|---|---|
| 2005/0223834 | A1* | 10/2005 | Otsuka | F16H 59/0204 74/473.18 |
| 2006/0053929 | A1* | 3/2006 | Tomida | F16H 59/0278 74/473.12 |
| 2007/0261510 | A1* | 11/2007 | Wang | F16H 59/10 74/523 |
| 2013/0291675 | A1* | 11/2013 | Burger | F16H 59/0278 74/473.24 |
| 2016/0348784 | A1* | 12/2016 | Kato | F16H 59/0278 |

FOREIGN PATENT DOCUMENTS

| | | |
|---|---|---|
| DE | 202005008178 | 8/2005 |
| DE | 102006017859 | 10/2007 |
| EP | 0834683 | 4/1998 |

(Continued)

OTHER PUBLICATIONS

Chinese Patent Application No. 201510599914.9 Office Action, dated Jun. 2, 2017 and English translation thereof.

(Continued)

*Primary Examiner* — Terence Boes
(74) *Attorney, Agent, or Firm* — Roberts Mlotkowski Safran Cole & Calderon, P.C.

(57) ABSTRACT

In a shift lever device, a detent rod is assembled to a lever main body, and when a detent pin of the detent rod engages with a detent body and rotation is stopped, a lever is restricted from rotating. When a button is press-operated, the detent rod is displaced, engagement of the detent pin with the detent body is released, and the lever is allowed to rotate. The detent rod is assembled to the outside of the lever main body. This enables to detent rod to be easily assembled to the lever main body.

10 Claims, 5 Drawing Sheets

(56) References Cited

FOREIGN PATENT DOCUMENTS

| | | |
|---|---|---|
| EP | 1111276 | 6/2001 |
| JP | S5825731 U | 2/1983 |
| JP | 09-014412 | 1/1997 |
| JP | 2008201345 A | 9/2008 |

OTHER PUBLICATIONS

Japanese Office Action for corresponding Japanese Patent Application No. 2014-214784 dated Sep. 6, 2016 and English translation thereof.
European Search Report (EECR) dated Mar. 2, 2016.

* cited by examiner

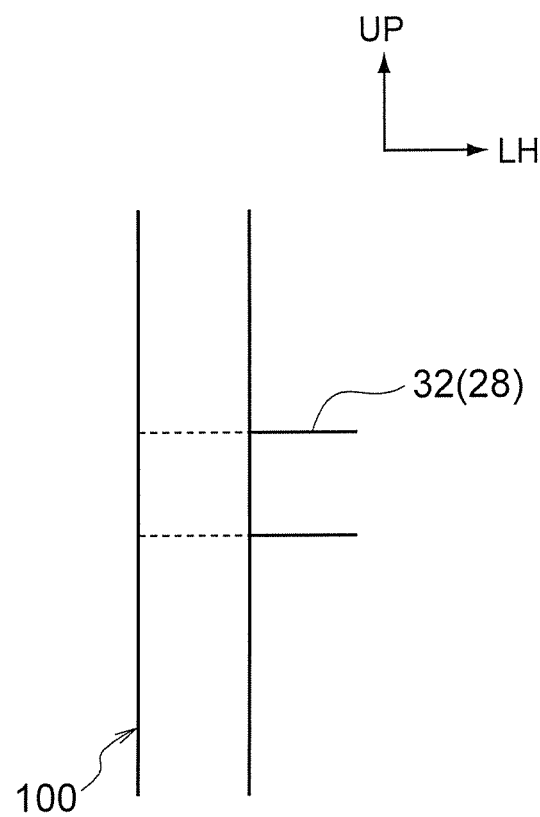

SHIFT DEVICE

CROSS-REFERENCE TO RELATED APPLICATION

This application claims priority under 35 USC 119 from Japanese Patent Application, No. 2014-214784 filed Oct. 21, 2014, the disclosure of which is incorporated by reference herein.

BACKGROUND

Field of the Invention

The present invention relates to a shift device in which a shift body is capable of moving between shift positions.

Related Art

In a shift lever device described in Japanese Patent Application Laid-Open (JP-A) No. H09-14412, a detent pin of a rod of a shift lever engages with an engagement portion of a detent plate, movement of the shift lever is thereby restricted. Movement of the shift lever is permitted by releasing the engagement of the detent pin with the detent plate (engagement portion).

Note that the rod is assembled inside the shift lever in the above-described shift lever device.

SUMMARY

In consideration of the above circumstances, a shift device in which an engagement body can be easily assembled to a shift body is obtained.

A shift device of a first aspect includes: a shift body that is configured to move between shift positions; an operation section that is provided at the shift body and that is configured to be operated; an engagement body that is assembled at the shift body at an outer side of the shift body; and a restricting body with which the engagement body engages to restrict movement of the shift body, and that permits movement of the shift body by engagement with the engagement body being released by operation of the operation section.

A shift device of a second aspect is the shift device of the first aspect, further including an engagement portion that is integrally provided at the engagement body and that is configured to engage with the restricting body.

A shift device of a third aspect is the shift device of the first aspect or the second aspect, wherein the engagement body is configured to be temporarily attached to the shift body prior to connection of the operation section and the engagement body.

A shift device of a fourth aspect is the shift device of any one of the first aspect to the third aspect, further including an urging member that is penetrated by the engagement body and that urges the engagement body toward one side, the engagement body being supported by the shift body at another side of the urging member.

A shift device of a fifth aspect is the shift device of any one of the first aspect to the fourth aspect, wherein the engagement body is made of resin.

In the above aspects, it is possible that the shift body includes an elongated lever main body that is configured to rotate between the shift positions, and the engagement body is assembled at the lever main body at an outer side of the lever main body, and further it is possible that an assembly portion is provided at an outer side portion of the lever main body so as to protrude toward the outer side, and an end portion, which is at a side opposite to the operation section, of the engagement body is supported at the assembly portion.

In the shift device of the first aspect, the shift body is capable of moving between shift positions. The engagement body is assembled to the shift body. The engagement body is engaged to the restricting body, restricting movement of the shift body. Movement of the shift body is permitted by the engagement of the restricting body with the engagement body being released by the operation section of the shift body being operated.

Note that the engagement body is assembled to the outside (the outside portion) of the shift body. This enables easy assembly of the engagement body to the shift body.

In the shift device of the second aspect, the engagement portion provided at the engagement body is capable of engaging with the restricting body.

Note that the engagement portion is integrally provided to the engagement body. This enables even easier assembly of the engagement body to the shift body.

In the shift device of the third aspect, the engagement body is capable of temporarily assembling (attaching) to the shift body prior to connecting (communicating) the operation section and the engagement body. This enables the operation section and the engagement body to be connected (communicated) together easily.

In the shift device of the fourth aspect, the engagement body penetrates through the urging member, the urging member urges the engagement body toward the one side, and the engagement body is supported by the shift body at the another side of the urging member. This enables the engagement body to be well supported by the shift body.

In the shift device of the fifth aspect, the engagement body is made of resin. This enables the engagement body to be easily displaced.

BRIEF DESCRIPTION OF THE DRAWINGS

Embodiments of the invention will be described in detail with reference to the following figures, wherein:

FIG. 5 is a simplified face-on view illustrating a detent body according to an exemplary embodiment of the present invention, viewed from the front.

DETAILED DESCRIPTION

Figure 1:
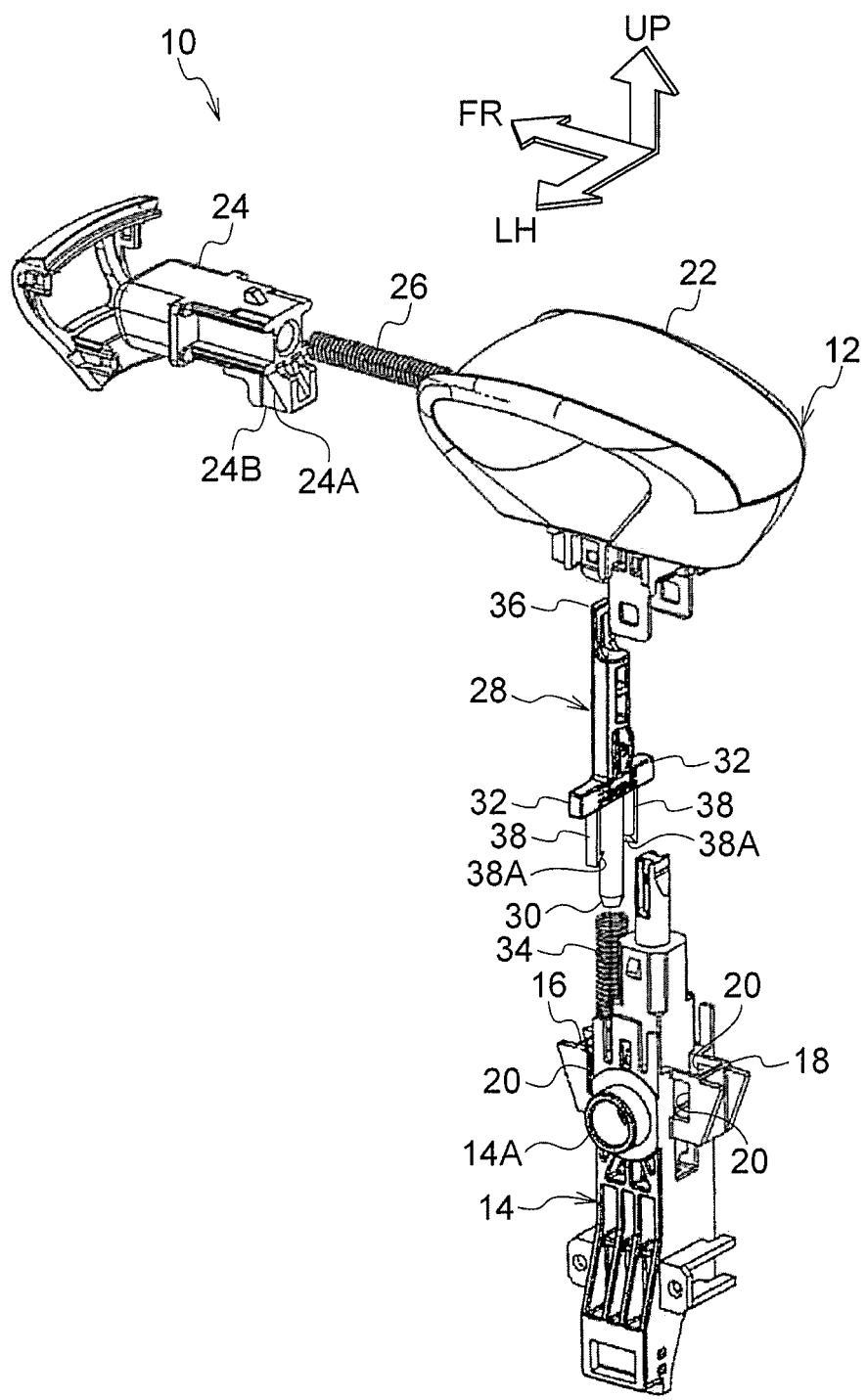
FIG. 1 is an exploded perspective view illustrating a shift lever device according to an exemplary embodiment of the present invention, viewed diagonally from the rear left.
Figure 2:
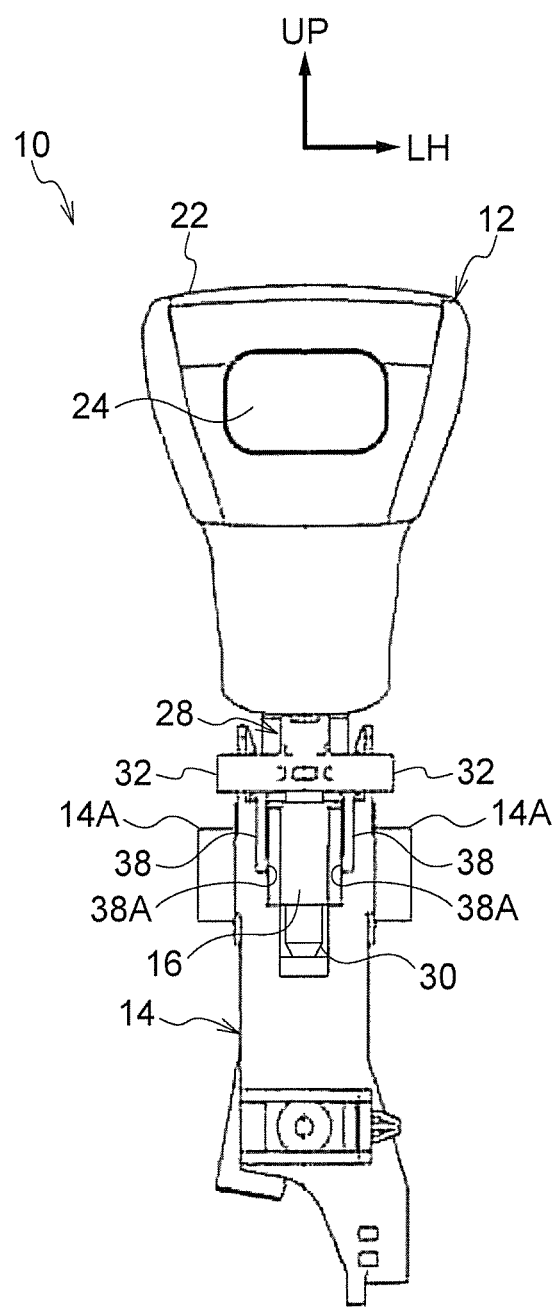
FIG. 2 is a face-on view illustrating a shift lever device according to an exemplary embodiment of the present invention, viewed from the front.
Figure 3:
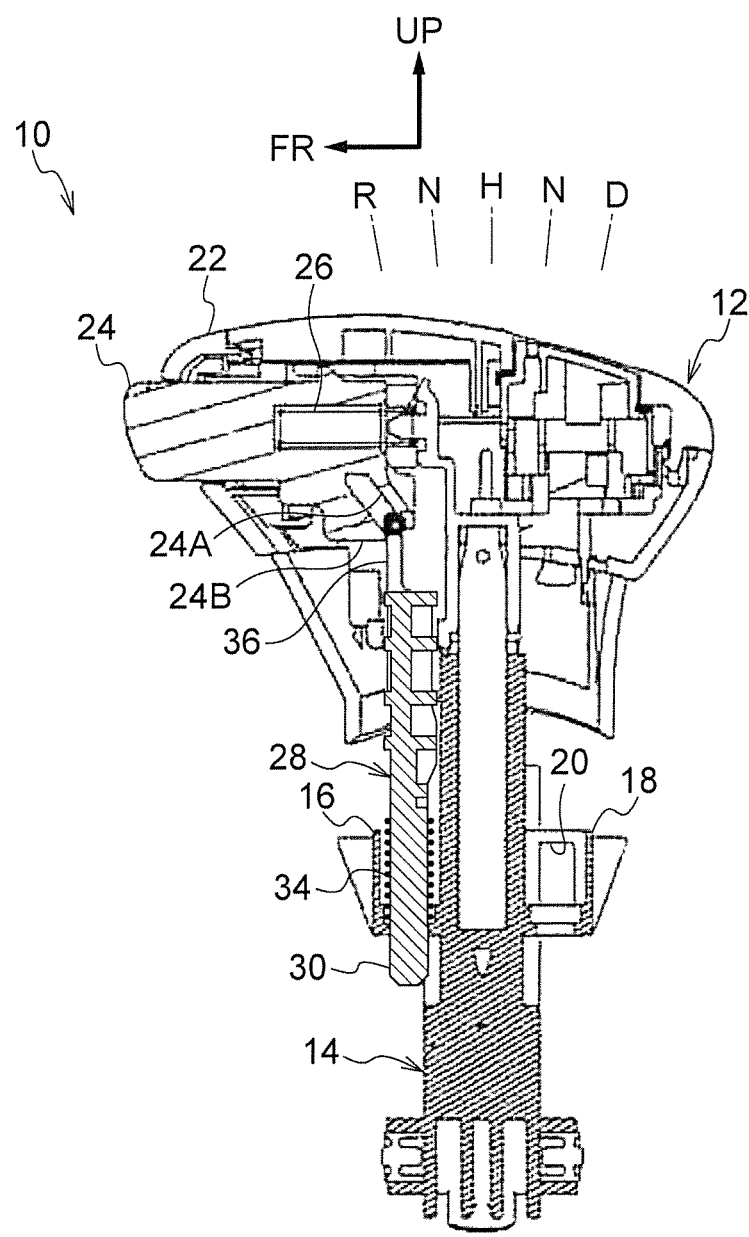
FIG. 3 is a side view illustrating a shift lever device according to an exemplary embodiment of the present invention, viewed from the left.

FIG. 1 is an exploded perspective view of a shift lever device 10 serving as a shift device according to an exemplary embodiment, viewed diagonally from the rear left. FIG. 2 is a face-on view of the shift lever device 10 viewed from the front, and FIG. 3 is a side view of the shift lever device 10 viewed from the left. Note that in the drawings, the arrow FR indicates the front of the shift lever device 10, the arrow LH indicates the left of the shift lever device 10, and the arrow UP indicates the upper side of the shift lever device 10.

The shift lever device 10 according to the present exemplary embodiment is what is referred to a straight type, and is a shift-by-wire type. The shift lever device 10 is a floor-mounted type, and is installed to a floor section of a vehicle cabin, at the vehicle width direction inner side of a driving seat of a vehicle (automobile) (not illustrated in the drawings). The front side, the left side, and the upper side of the shift lever device 10 are oriented toward the front side, the left side, and the upper side of the vehicle. In the present exemplary embodiment, the vehicle is right-hand drive, and the shift lever device 10 is disposed at the vehicle left side of the driving seat.

The shift lever device 10 is provided with a rectangular parallelopiped box shaped housing (plate, not illustrated in the drawings) as a vehicle body side, and the housing is fixed to the floor section of the vehicle cabin.

As illustrated in FIG. 1 to FIG. 3, the shift lever device 10 is provided with a lever 2, serving as a shift body.

The lever 12 is provided with an elongated rod shaped lever main body 14, and the lever main body 14 is symmetrically shaped with respect to a plane that passes through the front-rear direction center and is perpendicular to the front-rear direction. An up-down direction intermediate portion of the lever main body 14 is integrally provided with a pair of circular cylinder shaped support shafts 14A, and the support shafts 14A project out toward the right side and left side of the lever main body 14. The lever main body 14 is supported by the housing at the pair of support shafts 14A so as to be capable of rotating (pivoting), and the lever 12 is capable of rotating (moving) in the front-rear direction with the pair of support shafts 14A as the center axis.

The lever 12 is thereby capable of being placed in an "R" position (reverse position), an "N" position (neutral position), an "H" position (home position), an "N" position (neutral position), and a "D" position (drive position), each serving as shift positions, on progression from the front side to the rear side. The lever 12 is urged in direction, from the "R" position and the "D" position, toward the "H" position, and the lever 12 is rotated toward the "H" position by the urging force when there is no rotating operation force acting on the lever 12.

The up-down direction intermediate portion of the outer side portion of the lever main body 14 is integrally provided with substantially rectangular tube shaped assembly frames 16 and 18, each serving as an assembly portion. The assembly frame 16 projects out (protrudes) toward the front side (outer side) of the lever main body 14, and the assembly frame 18 projects out (protrudes) toward the rear side (outer side) of the lever main body 14. Upper faces of the assembly frames 16 and 18 are open, and lower ends of the assembly frames 16 and 18 are provided with lower walls. Rectangular shaped temporary assembling (attaching) holes 20 (temporary retaining holes), serving as a temporary attaching portion, are formed respectively penetrating through a left wall and a right wall of each of the assembly frames 16 and 18, and each temporary assembling hole 20 is elongated in the up-down direction.

The lever main body 14 extends out at the upper side of the housing so as to be capable of rotating, and a substantially rectangular parallelopiped shaped knob 22, serving as a grip portion, is assembled to an upper end portion of the lever main body 14. The knob 22 is capable of being gripped by an occupant of the vehicle (particularly the driver), and the lever 12 is capable of a rotating operation in a state in which the occupant is gripping the knob 22.

Figure 4:
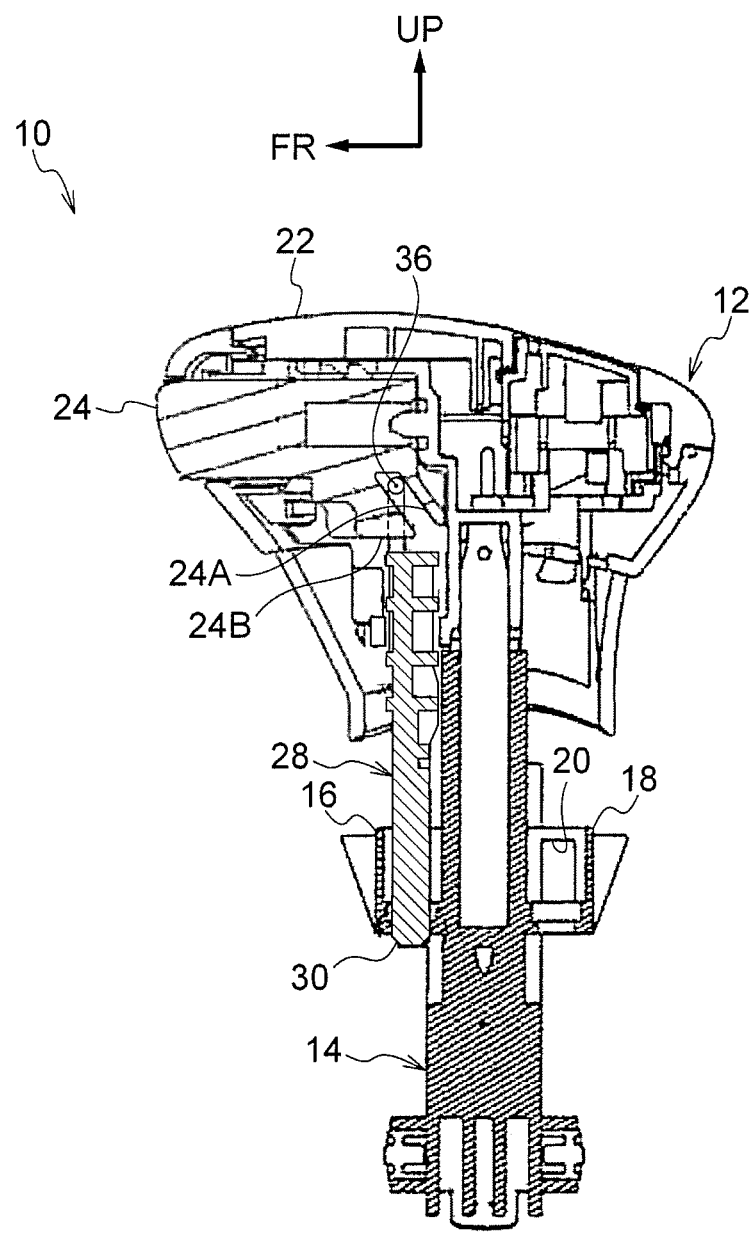
FIG. 4 is a side view illustrating a shift lever device according to an exemplary embodiment of the present invention during operation of a button, viewed from the left.

The knob 22 is provided with a substantially rectangular column shaped button 24 serving as an operation section, and the button 24 is capable of moving within a specific range in the front-rear direction. A knob spring 26 (a coil spring), serving as an operation urging means, spans across between the button 24 and the knob 22, and the knob spring 26 is compressed, urging the button 24 toward the front side. The button 24 projects out from the knob 22 toward the front side, and the button 24 is capable of being press-operated toward the rear side by the occupant against the urging force of the knob spring 26 (see FIG. 4).

An operation face 24A, serving as a communication portion (connecting portion), is formed at a rear side and lower side end portion of the button 24, and the operation face 24A slopes in an upward direction on progression toward the front. The button 24 is integrally provided with a substantially triangular plate shaped insertion plate 24B at the front side of the operation face 24A, and a rear end face of the insertion plate 24B is disposed parallel to the operation face 24A.

A substantially rod shaped detent rod 28, made of resin and serving as an engagement portion, is disposed at the front side of the lever main body 14, and a substantially circular column shaped assembly column 30, serving as an assembled portion, is provided at a lower portion (which is at the opposite side to the button 24 side in the longitudinal direction) of the detent rod 28. The assembly column 30 is inserted into the assembly frame 16, which is at the front side of the lever main body 14, from the upper side, and penetrates through and fits together with the lower wall of the assembly frame 16. The detent rod 28 is thereby assembled to the assembly frame 16, at the front side, namely, at the outer side (at the outer portion) of the lever main body 14.

The detent rod 28 is integrally formed with a pair of rectangular column shaped detent pins 32, serving as an engagement portion, at the upper side of the assembly column 30. The detent pins 32 extend out respectively toward the right side and the left side from the detent rod 28.

A rod spring 34 (coil spring), serving as a displacement urging portion (member), spans (bridges) across between the pair of detent pins 32 and the lower wall of the assembly frame 16 of the lever main body 14. The rod spring 34 is compressed in a state with the assembly column 30 penetrating through the inside of the rod spring 30, and urges the detent rod 28 toward the upper side.

An displacement frame 36, formed in an inverted U-shaped frame shape and serving as a displacement portion, is provided at an upper end portion of the detent rod 28, and the displacement frame 36 interior is open along the front-rear direction. The urging force of the knob spring 26 is larger than the urging force of the rod spring 34. An upper end of the displacement frame 36 abuts, due to the urging force of the rod spring 34, a lower end (a rear end) of the operation face 24A of the button 24, and the detent rod 28 is restrained from being displaced (sliding) toward the upper side. When the button 24 is press-operated toward the rear side against the urging force of the knob spring 26 as described above, due to the urging force of the rod spring 34, the insertion plate 24B of the button 24 is inserted inside the displacement frame 36 while the upper end of the displacement frame 36 slides toward the upper side (front side) on the operation face 24A, and the detent rod 28 is displaced toward the upper side (see FIG. 4).

The detent rod 28 is integrally formed with a pair of substantially rectangular plate shaped temporary assembling (attaching) claws 38 (temporary retaining claws), serving as a temporary assembled (attached) portion, and the temporary assembling claws 38 extend out toward the lower side from the respective detent pins 32. A lower end (leading end) of each temporary assembling claw 38 is integrally formed with a projecting portion 38A with a right-angled triangle shaped cross-section. The projecting portion 38A projects out toward the assembly column 30 side, and an upper face thereof is disposed perpendicular to the up-down direction. The temporary assembling claws 38 resiliently engage with the temporary assembling holes 20 of the assembly frame 16 of the lever main body 14, and the projecting portion 38A fits with the temporary assembling hole 20, at an up-down direction intermediate portion of the temporary assembling hole 20, in the front-rear direction.

When the detent rod 28 is displaced toward the upper side as described above, the projecting portions 38A are displaced toward the upper side along the temporary assembling holes 20. Prior to assembling the knob 22 to the upper end portion of the lever main body 14, upper faces of the projecting portions 38A are anchored to (stopped at) upper end faces of the temporary assembling holes 20 due to the urging force of the rod spring 34. Thus, in a state in which the assembly column 30 penetrates through the lower wall of the assembly frame 16, displacement toward the upper side, due to the urging force of the rod spring 34, of the detent rod 28 is stopped, moreover, the detent rod 28 is restrained from being displaced (tilting) in the radial direction thereof, so the detent rod 28 is temporarily assembled to (temporarily retained by) the lever main body 14.

At the housing side, a detent body 100 (FIG. 5) serving as a restricting body is provided, and the detent body 100 is disposed at an up-down direction intermediate portion of the lever 12, at at least one of the left side or right side. The detent body 100 is formed with a detent groove which has a specific shape. The detent groove is open at the upper side of the detent body 100, and the detent pin 32 of the detent rod 28 is disposed at the upper side thereof. Note that the detent groove is symmetrically shaped with respect to a plane that passes through the front-rear direction center of the detent pin 32 when the lever 12 is disposed in the "H" position, and that is perpendicular to the front-rear direction.

In a case in which the detent pin 32 has engaged with the detent groove and rotation in the front-rear direction is stopped when the lever 12 is rotated, the detent body 100 restricts (stops) the lever 12 from rotating (for example, rotating from the front side "N" position to the "R" position).

In contrast thereto, in a case in which when the button 24 has been press-operated toward the rear side and the detent rod 28 has displaced toward the upper side when the lever 12 is rotated, the detent pin 32 is displaced toward the upper side of the detent body 100 and does not engage with the detent groove. Rotating of the detent pin 32 is thereby not stopped in the front-rear direction, and the detent body 100 thereby allows the lever 12 to rotate.

Explanation follows regarding operation of the present exemplary embodiment.

In the shift lever device 10 with the above configuration, the detent rod 28 is assembled to the assembly frame 16 of the lever main body 14 of the lever 12. When the detent pin 32 of the detent rod 28 engages with the detent groove of the detent body 100 and rotation in the front-rear direction is stopped, the detent body 100 restricts the lever 12 from rotating. When the button 24 of the knob 22 of the lever 12 is press-operated toward the rear side against the urging force of the knob spring 26, the detent rod 28 is displaced toward the upper side due to the urging force of the rod spring 34, and engagement of the detent pin 32 with the detent groove is thereby released, and the detent body 100 allows the lever 12 to rotate.

Note that the detent rod 28 is assembled to the outside (the outside portion) of the lever main body 14. There is accordingly no need to insert the detent rod 28 into a center portion of the lever main body 14 along the length direction of the lever main body 14, enabling the detent rod 28 to be easily assembled to the lever main body 14.

Since the detent rod 28 is assembled to the outside of the lever main body 14, with the detent pins 32 and the detent rod 28 being integrally formed, enabling the detent rod 28 and the detent pins 32 can be assembled to the lever main body 14 in an integrated state. There is accordingly no need to assemble the detent pins 32 to the detent rod 28 which is in a state in which the detent rod 28 is inserted into the center portion of the lever main body 14, thereby enabling even easier assembly of the detent rod 28 (including the detent pins 32) to the lever main body 14.

Prior to assembling the knob 22 to the upper end portion of the lever main body 14, the upper faces of the projecting portions 38A of the temporary assembling claws 38 of the detent rod 28 are anchored to (stopped at) the upper end faces of the temporary assembling holes 20 of the assembly frame 16 of the lever main body 14 due to the urging force of the rod spring 34, thus, in a state in which the assembly column 30 of the detent rod 28 penetrates through the lower wall of the assembly frame 16, displacing of the detent rod 28 toward the upper side due to the urging force of the rod spring 34 is stopped, moreover, the detent rod 28 is restrained from being displaced in the radial direction, so the detent rod 28 is temporarily assembled (attached) to the lever main body 14. Thus, when the knob 22 is assembled to the upper end portion of the lever main body 14, the displacement frame 36 of the detent rod 28 can be easily made to abut (connect (communicate) with) the operation face 24A of the button 24.

The assembly column 30 of the detent rod 28 penetrates through inside the rod spring 34, and the rod spring 34 is supported by the lower wall of the assembly frame 16 of the lever main body 14. The rod spring 34 urges the detent rod 28 toward the upper side (one side) at the pair of detent pins 32. At the lower side (another side) of the rod spring 34, the assembly column 30 of the detent rod 28 is supported in a state penetrating through the lower wall of the assembly frame 16 of the lever main body 14. This enables the detent rod 28 to be well supported by the assembly frame 16, and enables the detent rod 28 to be displaced in the up-down direction with respect to the assembly frame 16.

The detent rod 28 is lightweight, being made of resin. This enables the detent rod 28 to be easily displaced, enables the urging force of the rod spring 34 to be smaller, and also enables the urging force of the knob spring 26, which is larger than the urging force of the rod spring 34, to be smaller. This enables the urging force of the knob spring 26 with respect to the button 24 to be smaller, enabling the press-operation force of the button 24 to be smaller.

As described above, the detent rod 28 is integrally provided with the detent pins 32. This enables the number of components to be reduced.

In the shift lever device 10 according to the present exemplary embodiment for use in a right-hand drive vehicle, by inverting the housing and the lever main body 14 about the up-down direction, and assembling the detent rod 28 and the rod spring 34 to the assembly frame 18 of the lever main body 14, the shift lever device 10 can be changed to a shift lever device for use in a left-hand drive vehicle. Thus the housing, the lever main body 14, the detent rod 28, the rod spring 34, and the knob 22 can be commonly employed in both the shift lever device 10 for use in a right-hand drive vehicle, and the shift lever device for use in a left-hand drive vehicle.

In the present exemplary embodiment, the detent rod 28 is assembled to the front side (front side portion) of the lever main body 14. However, the detent rod 28 may be assembled to the rear side, the right side, or the left side of the lever main body 14.

In the present exemplary embodiment, the detent pins 32 are integrally formed to the detent rod 28. However, the detent pins 32 may be fixed to the detent rod 28 to form an integral unit.

In the present exemplary embodiment, the detent rod 28 is provided with the pair of detent pins 32. However, the detent rod 28 may be configured provided with only one detent pin 32.

In the present exemplary embodiment, the shift lever device 10 is a shift-by-wire type. However, the shift lever device 10 may be a shift device other than a shift-by-wire type (such as a mechanical cable type).

In the present exemplary embodiment, the shift lever device 10 is a floor-mounted type shift device installed at the floor section of the vehicle cabin. However, the shift lever device 10 may be installed to a steering wheel column cover or an instrument panel in the vehicle cabin.

What is claimed is:

1. A shift device comprising:
    a shift body that includes an elongated main body, a grip portion for being gripped by an occupant of a vehicle being assembled at one end portion of the main body in a longitudinal direction thereof, and the main body having a rotation support portion thereat so as to be rotatable with the rotation support portion being a center of rotation of the main body such that the shift body is configured to move between shift positions; and;
    an operation section that is provided at the grip portion and that is configured to be operated;
    an engagement body that is assembled at the main body at an outer side of the main body; and
    a restricting body with which the engagement body engages to restrict movement of the shift body, and that permits movement of the shift body by engagement with the engagement body being released by operation of the operation section,
    wherein an assembly portion is integrally provided at an outer side portion of the main body so as to protrude toward an outer side of the main body, and the engagement body is supported at the assembly portion,
    wherein the engagement body includes an extended portion that extends from the engagement body in a vehicle width direction, and
    wherein the restricting body is disposed at at least one side of the shift body in the vehicle width direction, and an engaged portion, with which the extended portion is to be engaged, is formed at the restricting body.

2. The shift device of claim 1, further comprising an engagement portion that is integrally provided at the engagement body and that is configured to engage with the restricting body.

3. The shift device of claim 1, wherein the engagement body is configured to be temporarily attached to the shift body prior to connection of the operation section and the engagement body.

4. The shift device of claim 1, further comprising an urging member that is penetrated by the engagement body and that urges the engagement body toward one side, the engagement body being supported by the shift body at another side of the urging member.

5. The shift device of claim 1, wherein the engagement body is made of resin.

6. The shift device of claim 1, wherein: the shift body includes an elongated lever main body that is configured to rotate between the shift positions; and the engagement body is assembled at the lever main body at an outer side of the lever main body.

7. The shift device of claim 6, wherein: an end portion, which is at a side opposite to the operation section, of the engagement body is supported at the assembly portion.

8. The shift device of claim 4, wherein: the shift body includes an elongated lever main body that is configured to rotate between the shift positions; and the engagement body is assembled at the lever main body at an outer side of the lever main body.

9. The shift device of claim 8, wherein: an end portion, which is at a side opposite to the operation section, of the engagement body is supported at the assembly portion.

10. The shift device of claim 1, wherein, in an assembled state of the engagement body to the assembly portion, the engagement body is supported at the assembly portion such that the engagement body is configured to move with respect to the assembly portion along a longitudinal direction of the main body.

* * * * *